Patented Feb. 6, 1923.

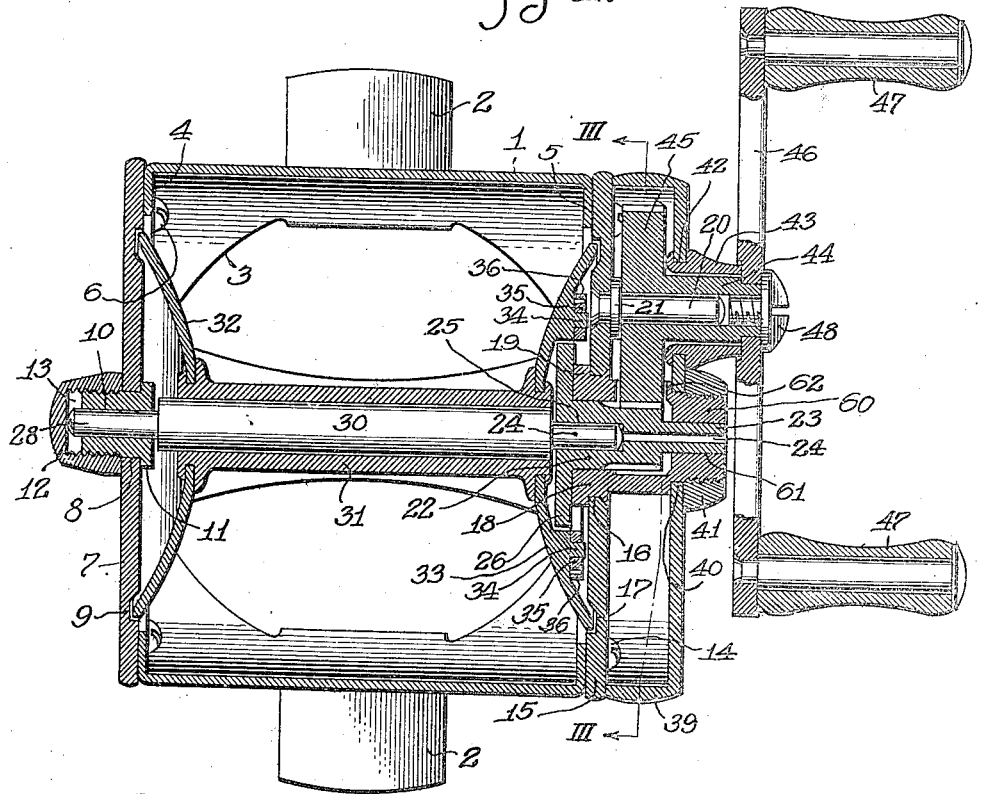

1,444,560

UNITED STATES PATENT OFFICE.

WILLIAM SCHMID, OF BRONSON, MICHIGAN.

FREE SPOOL REEL.

Application filed February 4, 1921. Serial No. 442,351.

*To all whom it may concern:*

Be it known that I, WILLIAM SCHMID, a citizen of the United States of America, residing at Bronson, in the county of Branch and State of Michigan, have invented certain new and useful Improvements in Free Spool Reels, of which the following is a specification, reference being had therein to the accompanying drawings.

Successful and skillful bait casting in the piscatorial art depends to a great extent on the fish line reel, and many reels have been especially designed for bait casting to insure easy playing out of the line; rapid recovery thereof, and prevent "back lash" or entanglement of the line at the end of a cast.

My invention aims to provide a bait casting reel having free spool at high velocity, and positive and reliable means, in a manner as hereinafter set forth, for normally establishing a driving relation between the spool and a spool operating mechanism. It is in this connection that the reel may be operated in the usual manner, but when casting the spool is temporarily free of its operating mechanism, so that a line on the spool may freely unwind. Numerous advantages are gained by a free revolving spool, among which may be mentioned those permitting farther casting by relieving the spool of any drag or load by the reel operating mechanism; that of reducing the wear and tear on the operating mechanism, particularly at high speeds, and that of preventing, to a certain degree, back lash or line entanglement.

My invention further aims to furnish a reel having a spool and spool operating mechanism with an automatic centrifugal clutch normally establishing a driving relation between the spool and its operating mechanism, and when the line revolves the spool, as in casting, centrifugal force actuates the clutch and automatically releases the spool relative to its operating means, whereby the spool may freely revolve. When the speed of the revolving reel is decreased the clutch automatically picks up the operating mechanism and by reason of its load further reduces the speed of the spool to prevent reverse winding of the fish line.

My invention further resides in certain novel features of construction which contribute to a practical fish line reel, and these features and the details of construction will now be described by aid of the drawing wherein:—

Figure 1 is a longitudinal sectional view of the reel;

Fig. 2 is a cross sectional view of the same showing the centrifugal clutch, and Fig. 3 is a fragmentary cross section on the line III—III of Fig. 1.

In the drawing, the reference numeral 1 denotes a reel frame or body having the usual reel seat members 2, and the frame or body is cut away, as at 3, to reduce its weight and permit of easy access being had to the interior of the frame or body. At the ends of the frame or body are inturned flanges 4 and 5 and connected to the flange 4, by screws 6 or other fastening means is an end plate 7 provided with a concentric opening 8 and an annular groove 9, said groove being formed in the inner face of the end plate 7, contiguous to its marginal edges.

Mounted in the opening 8 of the end plate 7 is a pintle bearing 10 limited in its outward movement relative to the end plate 7 by a head 11 on the inner end of said bearing, and the outer end of said bearing is exteriorly screwthreaded to receive a cap 12 which cooperates with the head 11 in holding the bearing relative to the end plate. The cap 12 cooperates with the bearing 10 in providing an end chamber 13 in which a suitable lubricant may be placed, and this bearing will again be referred to.

Connected to the end flange 5 of the reel frame or body 1, by screws 14 or other fastening means, is an end plate 15 and this plate is provided with a concentric opening 16 and an annular groove 17, similar to the end plate 7. Fixed in the opening 16 of the end plate 15 is a bushing 18 which has its inner end enlarged or provided with a head 19 engaging the inner face of tl end plate 15, and the outer end of the bushing is provided with a reduced exteriorly screwthreaded portion 60, said screwthreaded portion being closed, with the exception of an axial opening 61. The intermediate portion of the bushing 18 has a transverse slot 62 and an upset flange against the end plate, so that the bushing 18 will be a fixture relative to said end plate. The end plate is provided with another fixture in the form of a stub shaft 20 eccentrically disposed in said end plate and projecting from the outer face thereof, said stub shaft having a collar 21 against the outer face of the end plate 15 and the inner end of said stub shaft upset or riveted so as to positively hold the stub shaft relative to the end plate.

Journaled in the bushing 18 is a spool pinion 22 having its outer end provided with teeth constituting a small pinion exposed at the transverse slot 62 of the bushing. The outer end of the pinion is also reduced to afford a spindle 23 journaled in the bushing opening 61, and said spindle has a longitudinal port 24 communicating with a pintle recess 25 in the inner end of the spool pinion 22. The inner end of the spool pinion 22 terminates in a circular clutch member 26 having its outer face provided with clutch jaws or abutments 27, which are in opposed relation, as best shown in Fig. 2. The clutch member 26 abuts the head 19 of the bushing 18 and the clutch jaws 27 are about the head 19 in proximity to the end plate 15 thus providing a compact arrangement of said elements.

The bearing 10 cooperates with the spool pinion 22 in supporting the pintles 28 and 24 of a spool shaft 30, said shaft being axially of the reel frame or body 1 with the pintle 28 extending through the bearing 10 against the inner wall of the cap 12 so as to be lubricated by any lubricant within the chamber 13 of said cap. The pintle 24 extends into the recess 25 of the spool pinion 22 and this particular pinion may be lubricated by virtue of the port 24 which is open at the outer end of the pinion spindle 23. The constructive arrangements of the pintles 28 and 24 relative to the bearings thereof permit of the cap 12 being adjusted to insure free movement of the spool shaft or such a movement may be regulated, to a certain extent, by causing the cap 12 to cooperate with the spool pinion 22 in providing a frictional brake for the action of the spool shaft 30.

Suitably fixed on the spool shaft 30 is a spool sleeve 31 provided with convexo-concave or dished end members 32 and 33, the end member 32 having its peripheral edges extending into the annular groove 9 of the end plate 7, and the peripheral edges of the end member 33 extending into the annular groove 17 of the end plate 15. The end members 32 and 33 are fixed on the ends of the spool sleeve 31 in the usual and well known manner and said end members cooperate with the spool sleeve in providing an annular holder for a fish line.

The concave face of the end member 33 which confronts the end plate 15 is provided with diametrically opposed bearings or pivots 34 for pivoted centrifugally actuated clutch pawls 35 which are necessarily disposed in opposed relation and these clutch pawls are adapted to normally engage the clutch jaws 27 so as to establish a driving relation between the spool end member 33 and the spool pinion 22. Holding the clutch pawls 35 in engagement with the clutch jaws 27 are substantially flat springs 36 carried by posts 37 of the spool end member 33. The clutch pawls 35 when actuated by centrifugal force have somewhat the action of governor arms and swing outwardly, as indicated by dot and dash lines in Fig. 2. The outward movement of said clutch pawls is limited by stop pins or posts 38 carried by the concave face of the spool end member 33. With the clutch pawls 35 distended and in engagement with the stop pins 38 the clutch member 26 is released. The spool may revolve at high speed, without any drag or retarding action by reason of the spool pinion 22 and the operating mechanism thereof which will now be considered.

Clamped against the outer face of the end plate 15 is a comparatively flat cylindrical gear housing 39 which affords an enclosure for the greater part of the driving mechanism. The gear housing 39 has a concentric opening 40 through which extends the outer exteriorly screwthreaded end of the bushing 18 to receive a nut 41 which clamps the gear housing 39 against the intermediate portion of the bushing, and since said bushing has its inner end fixed relative to the end plate 15, it is apparent that the bushing will serve in conjunction with the cylindrical wall of the gear housing, as spacer for said housing, thus maintaining a chamber within the housing for the driving mechanism.

The gear housing 39 has an eccentrically disposed opening 42 and riveted or otherwise mounted in the opening 42 is an outwardly extending barrel or ferrule 43. Extending through the barrel or ferrule 43 is a hub portion 44 of a large drive gear 45, said drive gear being rotatable on the stub shaft 20 carried by the end plate 15. As shown in Fig. 3, the large drive gear 45 extends into the transverse slot 62 of the bushing and meshes with the spool pinion 22, thereby establishing a driving relation between the spool pinion and the hub portion 44 of the large drive gear 45.

The hub portion 44 of the large drive gear 45 is reduced to receive a crank 46 having one or more handles 47 and said crank is detachably held on the reduced end of the hub 44 by a screw 48 extending into the hub of the large gear 45, the inner end of said screw being in spaced relation to the stub shaft 20 so that a lubricant may be placed in the hub of the large gear wheel to insure free movement of the large gear on the stub shaft.

Considering the operation of the fish line reel when casting, the first line foot or fraction thereof to be played out, by swinging a rod in the usual manner, causes the spool to spin and the first few revolutions of the spool causes the spool operating mechanism to be driven by the spool, but as the spool gains in speed centrifugal force effects the clutch pawls 35 and causes said clutch pawls to be swung outwardly against the stop pins 38, thereby releasing the spool operating mechanism relative to said spool. The projected line can therefore freely revolve the spool without any material drag on the same.

In casting, it is the usual practice to "thumb" the reel so that when the sinker, bait or lure, on the end of the line strikes the surface of the water, the speed of the spool may be momentarily retarded, to prevent back lash or reverse winding and entanglement of the line. This practice may be continued, but when the line is in the water or fully cast, there is an inherent retardation of the spool, produced by the line, and this retardation is sufficient to reduce the centrifugal force which maintains the clutch pawls distended, permitting said clutch pawl to assume normal position, as shown in Fig. 2, thereby automatically re-establishing the driving relation between the spool and the operating mechanism so that the operating mechanism will serve as a drag or load on the fish line spool. This will prevent back lash, to a large degree and the driving mechanism will always be in position to permit of the line being immediately recovered should there be a strike.

From the foregoing it will be observed that the engagement and disengagement between the fish line spool and its driving mechanism is automatic, and that the governor which controls the engaging and disengaging of the spool and driving mechanism occupies a space which does not decrease the size of the reel nor lend material greater weight to the same.

I attach considerable importance to the constructive arrangement of the driving mechanism insomuch that the fish line spool, the pinion, and the drive gear have substantial bearings, the fish line spool being removable endwise from the reel frame when the end plate 15 is removed, and it will be noted that this end plate may be easily removed, with the stub shaft 20, bushing 18 and pinion 22, after the gear housing 39 is removed, which may carry with it the crank 46 and the drive gear 45. In other words, the parts of the reel may be easily and quickly disassembled for cleaning purposes, but this is very seldom necessary due to the novel manner in which the spool operating mechanism is enclosed and all bearings protected against sand and other foreign matter.

Another feature of my invention is that of obtaining considerable leverage in driving the spool, which is brought about by having a small spool pinion, a large radius connection from the pinion to the spool end member 33, and a large drive gear for the pinion; the ratio being such as to permit easy turning of the spool with a heavy load. Ordinarily the spool pinion 22 is fixed relative to the spool or movement imparted to the spool near its axis, but in my construction the clutch pawls 35 transfer the drive to the marginal or outer portions of the spool, thus obtaining a radius or leverage drive from the spool pinion.

One embodiment of my invention has been illustrated, but the structural elements are susceptible to such changes, in size, shape and manner of assemblage, as fall within the scope of the appended claims.

What I claim is:—

1. A fish line reel comprising a frame, end plates carried thereby, a rotatable spool between said end plates, a gear housing connected to one of said end plates, a driven spool pinion rotatably supported independent of said spool from said gear housing and the adjacent end plate and in which pinion one end of the spool is supported and adapted to be operated therefrom, driving means in said gear housing for said spool pinion, and engaging and disengaging means controlling the operation of said spool by said pinion.

2. A fish line reel as in claim 1, characterized by said engaging and disengaging means being automatically actuated at high speeds to permit of said spool being line actuated, otherwise said means establishing a driving relation between said spool and pinion.

3. A fish line reel comprising a line carrying spool which may be rotated by a cast line, spool operating means, and governor means normally establishing a driving relation between said spool and its operating means, said governor means momentarily causing actuation of the operating means by said spool when the line thereof is cast, and releasing said operating means relative to said spool as the line is played out and the spool gains in speed, said governor means picking up the operating means when the speed of the spool is reduced by the line reaching its destination to establish the normal relation between said spool and its operating means and by said relation producing a retarding or dragging action on the spool to prevent back lash of the line.

4. A fish line reel having a rotatable spool, a gear housing, a slotted bushing extending into said housing, a pinion journaled in said slotted bushing and adapted to drive said spool, a driving gear for said pinion, supporting means for said bushing and gear and separable relative to said gear housing and spool, and means governed by the speed of said spool controlling the driving relation between said spool and pinion.

5. A fish line reel comprising a frame, end plates thereon, a bushing carried by one of said end plates, a stub shaft carried by the same end plate, said bushing and shaft being bodily removable with said plate, a rotatable line spool supported from the other end plate and said bushing, a pinion in said bushing adapted to rotate said spool, and a drive gear on said stub shaft extending into said bushing and adapted to drive said pinion.

6. A fish line reel as in claim 5, characterized by a governor in the end of said spool extending as near as possible to the marginal edges of said spool for leverage purposes and normally establishing a driving relation between said spool and said pinion and permitting of said spool operating independent of said pinion.

7. In a fish line reel, a driven pinion, a spool free at times to revolve relative to said pinion and adapted to be driven thereby, and means supported at marginal portions of said spool adapted to transmit power from said driven pinion to said spool.

In testimony whereof I affix my signature in presence of two witnesses.

WILLIAM SCHMID.

Witnesses:
  ARTHUR HEAPS,
  CASS J. SCRIBNER.